(12) United States Patent
Zhang et al.

(10) Patent No.: US 10,969,473 B2
(45) Date of Patent: Apr. 6, 2021

(54) INFRARED RANGE-MEASUREMENT DEVICE AND TIR LENS

(71) Applicant: BENEWAKE (BEIJING) CO., LTD., Beijing (CN)

(72) Inventors: Qingshun Zhang, Beijing (CN); Jiang Wu, Beijing (CN); Kai Zheng, Beijing (CN); Da Shu, Beijing (CN); Yuan Li, Beijing (CN)

(73) Assignee: BENEWAKE (BEIJING) CO., LTD., Beijing (CN)

( * ) Notice: Subject to any disclaimer, the term of this patent is extended or adjusted under 35 U.S.C. 154(b) by 616 days.

(21) Appl. No.: 15/740,310

(22) PCT Filed: Oct. 18, 2017

(86) PCT No.: PCT/CN2017/106656
§ 371 (c)(1),
(2) Date: Dec. 27, 2017

(87) PCT Pub. No.: WO2019/056432
PCT Pub. Date: Mar. 28, 2019

(65) Prior Publication Data
US 2019/0086516 A1 Mar. 21, 2019

(30) Foreign Application Priority Data

Sep. 20, 2017 (CN) .......................... 201710851117.4
Sep. 20, 2017 (CN) .......................... 201710852061.4

(51) Int. Cl.
*G01C 3/08* (2006.01)
*G01S 7/481* (2006.01)
(Continued)

(52) U.S. Cl.
CPC .......... *G01S 7/4814* (2013.01); *G01S 7/4813* (2013.01); *G01S 17/42* (2013.01); *G02B 19/0028* (2013.01); *G02B 19/0047* (2013.01)

(58) Field of Classification Search
CPC ............ G02B 19/0071; G02B 19/0061; G02B 19/0028; G02B 19/0066; G02B 19/0047; G01S 7/4813; G01S 7/4814; G01S 17/42
(Continued)

(56) References Cited

U.S. PATENT DOCUMENTS

| 3,937,575 A | 2/1976 | Bateman |
| 2002/0066851 A1* | 6/2002 | Hennick .............. H04N 1/0303 250/216 |

(Continued)

FOREIGN PATENT DOCUMENTS

| CN | 203880609 U | 10/2014 |
| CN | 105627252 A | 6/2016 |

(Continued)

OTHER PUBLICATIONS

International Search Report and Written Opinion for PCT/CN2017/106656 dated Jun. 15, 2018; 12 pages (English translation is not yet available).

(Continued)

*Primary Examiner* — Mark Hellner
(74) *Attorney, Agent, or Firm* — Schwabe Williamson & Wyatt, PC

(57) ABSTRACT

An infrared range-measurement device includes an emitting module, a receiving module and a calculating module, the emitting module includes an emitting light source and a driving circuit, and the receiving module includes a planar array photosensitive chip. The emitting light source, under the drive of the driving circuit, emits a test light beam, the test light beam is reflected by an object in a test range and (Continued)

then is incident on the planar array photosensitive chip, and the calculating module outputs a test light intensity or a test distance; an emitting lens is provided in an emitting light path of the emitting module. By shaping the test light beam to control a divergence angle and a shape of the light beam, and to make it match with the set working area of the planar array photosensitive chip, the overall utilization ratio of the test light beam is increased.

24 Claims, 3 Drawing Sheets

(51) Int. Cl.
*G02B 19/00* (2006.01)
*G01S 17/42* (2006.01)

(58) Field of Classification Search
USPC .................................................. 356/5.01
See application file for complete search history.

(56) References Cited

U.S. PATENT DOCUMENTS

| | | |
|---|---|---|
| 2005/0201096 A1 | 9/2005 | Terui |
| 2007/0180722 A1* | 8/2007 | Seitz ..................... G01B 7/012 33/559 |
| 2007/0181810 A1 | 8/2007 | Tan |
| 2011/0265830 A1* | 11/2011 | Gonzalez ................. C11D 1/72 134/26 |
| 2014/0071428 A1 | 3/2014 | Suzuki |
| 2014/0168968 A1* | 6/2014 | Streppel ................ F21V 7/0091 362/235 |
| 2016/0291136 A1 | 10/2016 | Lindskog |
| 2018/0180722 A1* | 6/2018 | Pei ........................ G01S 7/4815 |

FOREIGN PATENT DOCUMENTS

| | | | |
|---|---|---|---|
| CN | 106188954 A | 12/2016 | |
| CN | 106291574 A | 1/2017 | |
| CN | 205958751 U | 2/2017 | |
| CN | 106872961 A | 6/2017 | |
| CN | 106896367 A | 6/2017 | |
| CN | 107515402 A | 12/2017 | |
| CN | 207148313 U | 3/2018 | |
| CN | 207148319 U | 3/2018 | |
| WO | WO-9701728 A1 * | 1/1997 | ........... G02B 6/0001 |

OTHER PUBLICATIONS

Non-Final Office Action issued in U.S. Appl. No. 15/744,644 dated Mar. 13, 2020; 5 pages.
Notice of Allowance issued in U.S. Appl. No. 15/744,644 dated Aug. 6, 2020; 5 pages.
International Search Report and Written Opinion for PCT/CN2017/106659 dated Jan. 16, 2018; 17 pages including English translation.

* cited by examiner

INFRARED RANGE-MEASUREMENT DEVICE AND TIR LENS

The present application is the national phase of International Application No. PCT/CN2017/106656, titled "INFRARED RANGE-MEASUREMENT DEVICE AND TIR LENS", filed on Oct. 18, 2017, which claims the priorities to Chinese Patent Application No. 201710851117.4 titled "INFRARED RANGE-MEASUREMENT DEVICE", filed with the Chinese State Intellectual Property Office on Sep. 20, 2017, and Chinese Patent Application No. 201710852061.4 titled "INFRARED RANGE-MEASUREMENT DEVICE AND TIR LENS", filed with the Chinese State Intellectual Property Office on Sep. 20, 2017, the entire disclosures of which applications are incorporated herein by reference.

FIELD

The present application relates to the technical field of LIDAR, and particularly to an infrared range-measurement device and a TIR lens.

BACKGROUND

An optical scanning range-measurement device is a device using collimated light beam to perform non-contact scanning and ranging through the methods such as time of flight (TOF) method, triangulation method and the like. At present, a common optical scanning range-measurement device includes: a light emitting module, an optical lens, a chip for receiving and processing signals. The light emitting module emits a light beam, the optical lens is located in the light path of the light emitting module, the collimated light beam is emitted onto a surface of a measured object and after encountering an obstacle, is reflected onto the receiving chip. The receiving chip can calculate the distance from the measured object to the device by measuring the time between emitting and receiving, a phase difference, and a known velocity of light. Components for ranging such as the light emitting module, the optical lens, the light receiving module are installed on a continuously rotatable platform by this type of device to realize collimated light beam scanning, ambient distance signals of one round, i.e., of 360 degrees can be obtained by rotating a motor. Or, this type of device may also be fixedly installed on a moving robot or drone to detect obstacles in a corresponding ranging area as the robot moves forward and backward or turns. Currently, the above two modes are widely used in robots environment scanning, path planning, obstacle avoiding navigation, security detection and so on.

SUMMARY

An infrared range-measurement device and a TIR lens are provided according to the present application, which can increase the overall utilization ratio of the test light beam and make the measurement of the planar array photosensitive chip to be more accurate and efficient.

An infrared range-measurement device is provided according to the present application, including: an emitting module, a receiving module and a calculating module, the emitting module includes an emitting light source and a driving circuit, and the receiving module includes a planar array photosensitive chip;

the emitting light source, under the drive of the driving circuit, emits a test light beam, the test light beam is reflected by an object in a test range and then is incident on the planar array photosensitive chip, and the calculating module outputs a test light intensity or a test distance; and an emitting lens that shapes the test light beam and then emits the test light beam is provided in an emitting light path of the emitting module.

Preferably, the emitting lens includes a TIR lens body, the TIR lens body includes an emitting slot for accommodating the emitting light source and an emitting surface for emitting an incident light, and the emitting surface of the TIR lens body is of an arc shape which encircles around an emitting direction of the emitting light source.

Preferably, the TIR lens body further includes an abutting surface extending along an emitting circuit board with the emitting slot as the center, and the abutting surface performed with roughening treatment is fitted onto the emitting circuit board.

Preferably, a bottom surface of the emitting slot is a collimating lens, the collimating lens is of an arc shape which encircles around an emitting direction of the emitting light sources, light incident from the collimating lens is collimated by the collimating lens and then is emitted along the emitting surface.

Preferably, the TIR lens body further includes an upper reflecting surface and a lower reflecting surface, the upper reflecting surface and the lower reflecting surface are both cambered surfaces, light incident into the TIR lens body from both sides of the collimating lens are reflected by the upper reflecting surface and the lower reflecting surface and then emitted from the emitting surface.

Preferably, the cambered surface of each of the upper reflecting surface and the lower reflecting surface is a semi-conical cambered surface.

Preferably, the emitting surface is a semi-cylinder surface having an uniform curvature; or different areas of the emitting surface have different curvatures.

Preferably, the driving circuit is integrated on the emitting circuit board, the emitting light sources and the emitting lens are both mounted on the emitting circuit board, and the emitting light source is located between the emitting lens and the emitting circuit board.

Preferably, the emitting lens is provided with at least two positioning posts, and the emitting circuit board is provided with positioning holes matching with the positioning posts.

Preferably, the emitting lens is further provided with at least two clamping pieces located at different sides at positions close to the emitting circuit board, the emitting circuit board is provided with a buckle clamped to the clamping piece, and the emitting lens is connected to the emitting circuit board through a cooperating connection of the clamping piece and the buckle.

Preferably, a heat conducting piece is attached to the emitting circuit board, and the heat conducting piece conducts the heat from a higher temperature area to a lower temperature area of the emitting circuit board.

Preferably, the planar array photosensitive chip is arranged on a receiving circuit board, the receiving circuit board is provided with a receiving lens corresponding to the planar array photosensitive chip, and the emitting circuit board is provided with a first through hole, the receiving lens passes through the first through hole and abuts against a housing.

Preferably, the calculating module is integrated on a core board, the emitting module, the core board and the receiving module are electrically connected to an aerial socket board, the aerial socket board is in communication with the core board, the core board is in communication with the emitting module and the receiving module, the aerial socket board is connected to an external power supply and a robot through a female aerial socket, and the aerial socket board is connected to a detection upper computer through a male aerial socket.

Preferably, a working area of the planar array photosensitive chip is adjustable, a shaping range of the emitting lens is adjustable, and a testing scope corresponding to a divergence angle and a shape of the test light beam shaped by the emitting lens matches with the set working area of the planar array photosensitive chip.

Preferably, the infrared range-measurement device further includes a housing, the housing includes a front housing and a rear housing connected to the front housing, a mounting table is arranged inside the front housing, a lens channel is arranged in the mounting table, a receiving panel is arranged on the lens channel, and a second through hole for mounting an emitting panel is also arranged inside the front housing.

Preferably, a rubber sleeve is further sleeved on an exterior of the receiving lens arranged in the lens channel, and the rubber sleeve has one end abutting against an emitting circuit board on which the emitting light source is mounted and another end abutting against a lens mount of the receiving lens.

Preferably, at least one of the receiving panel and the emitting panel is a band pass filter.

Preferably, an exterior of the front housing is provided with a plurality of heat-dissipating fins.

Preferably, a heat-dissipating block is further connected to an inner side of the rear housing, and the heat-dissipating block abuts against the core board on which the calculating module is integrated.

Preferably, the front housing is further provided with a light guide post, a bottom end of the light guide post is further provided with a warning light connected to the core board for displaying the working state.

Preferably, the front housing and the rear housing are seal-connected through a rubber sealing ring or a heat-conducting silicone sealing ring.

Preferably, the front housing and the rear housing are seal-connected by a rubber sealing ring or a heat-conducting silicone sealing ring.

A TIR lens is further provided according to the present application, including a TIR lens body, and the TIR lens body includes an emitting slot for accommodating the emitting light sources and an emitting surface for emitting an incident light, and the emitting surface of the TIR lens body is of an arc shape which encircles around an emitting direction of the emitting light source.

Preferably, the TIR lens body further includes an abutting surface performed with roughening treatment.

Preferably, a bottom surface of the emitting slot is a collimating lens, the collimating lens is of an arc shape which encircles around an emitting direction of the emitting light source, a light that enters from the collimating lens is collimated by the collimating lens and then emitted along the emitting surface.

Preferably, the TIR lens body further includes an upper reflecting surface and a lower reflecting surface, the upper reflecting surface and the lower reflecting surface are both cambered surfaces, light incident on the TIR lens body from both sides of the collimating lens is reflected by the upper reflecting surface and the lower reflecting surface and then emitted from the emitting surface.

Preferably, the cambered surface of each of the upper reflecting surface and the lower reflecting surface is a semi-conical cambered surface.

Preferably, the emitting surface is a semi-cylinder surface having an uniform curvature.

Preferably, different areas of the emitting surface have different curvatures, and lights emitting from the emitting surface concentrate on one or a plurality of set areas.

Preferably, two positioning posts are respectively provided on the abutting surface at two sides of the emitting slot, and the mounting board for mounting the TIR lens is further provided with positioning holes matching with the positioning posts.

An infrared range-measurement device is further provided according to the present application, including the TIR lens described above.

Beneficial effects: by shaping the test light beam to control the divergence angle and shape of the light beam, and to make the test light beam match with the set working area of the planar array photosensitive chip, the overall utilization ratio of the test light beam is increased, so that the measurement of the planar array photosensitive chip is more accurate and effective.

Figure 1:
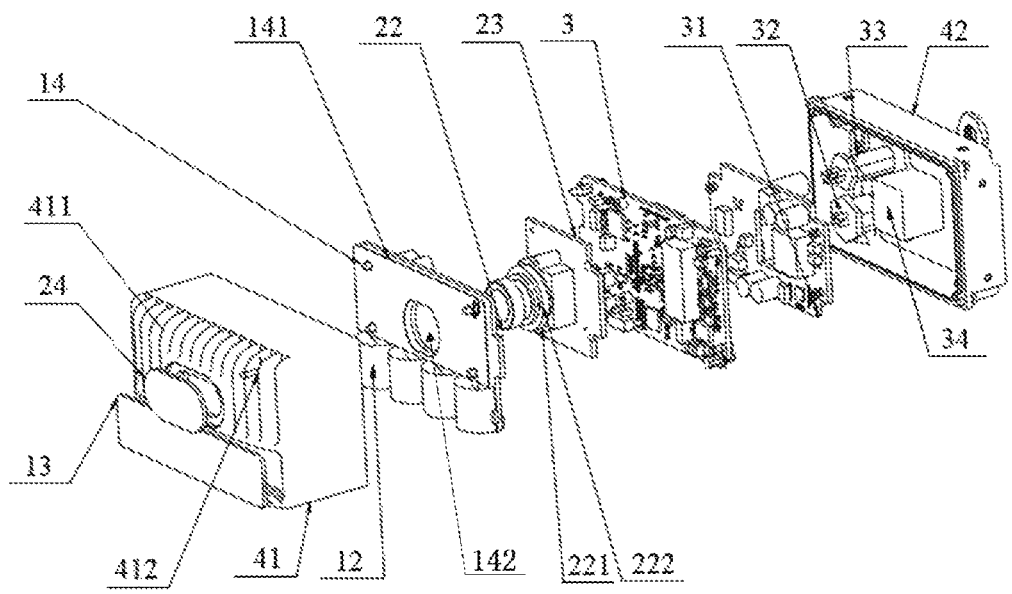
FIG. 1 is an exploded view showing an infrared range-measurement device according to a first embodiment of the present application.

| 3 | core board, | 11 | emitting light source, |
|---|---|---|---|
| 12 | emitting lens, | 13 | emitting panel, |
| 14 | emitting circuit board, | 22 | receiving lens, |
| 23 | receiving circuit board, | 24 | receiving panel, |
| 31 | aerial socket board, | 32 | female aerial socket, |
| 33 | male aerial socket, | 34 | heat-dissipating block, |
| 41 | front housing, | 42 | rear housing, |
| 121 | emitting surface, | 122 | emitting slot, |
| 123 | collimated lens, | 124 | upper reflecting surface, |
| 125 | lower reflecting surface, | 126 | positioning post, |
| 141 | graphite flake, | 142 | first through hole, |
| 411 | heat-dissipating fin, | 412 | light guide post. |

DETAILED DESCRIPTION

The technical solution according to the embodiments of the present application will be further described hereinafter in conjunction with the accompany drawings and the specific embodiments.

It should be noted that, on the premise of not conflicting, the embodiments and the features in the embodiments according to the present application may be combined with each other. The present application will be described in detail hereinafter in conjunction with the embodiments and with reference to the accompany drawings.

For those skilled in the art to better understand the present application, the technical solution according to the embodiments of the present disclosure will be described clearly and completely hereinafter in conjunction with the accompany drawings in the embodiments of the present disclosure. It is obvious that the described embodiments are only a part of the embodiments according to the present disclosure. All the other embodiments obtained by those skilled in the art based on the embodiments in the present disclosure without any creative work belong to the scope of the present disclosure.

It should be noted that, the terms "first", "second" and the like in the description, claims and drawings are used for distinguishing similar parts and are not intended to describe a specific sequence or precedence order. It should be understood that the data used in this way can be changed with each other under appropriate situations to facilitate the embodiments of the present application described herein. In addition, terms "include", "comprise" or any other variations are intended to cover non-exclusive encompassment, for example, a process, a method, a system, a product or a device including a series of steps or units, and are not limited to the explicitly-listed steps or units, but may include other steps or units which are not explicitly listed or which are inherent to the process, method, product or device.

When arranging the structure, the conventional optical scanning range-measurement device employs either a single-point laser radar, which has a too small test scope to meet the requirements for data in a horizontal and vertical scope of robots environment scanning, path planning, obstacle avoiding navigation, security detection and so on, or a 360-degree rotating laser range-measurement radar, which has high requirements for the mounting position and structure on the robot, and the data of 360 degrees cannot be completely measured due to the structural limitation.

The conventional planar array LIDAR often only focuses on a divergence angle of the test light beam, ignoring the light beam shape of the test light beam. In the case that a test light does not match with a test area of the receiving chip of the LIDAR, the requirement of the intensity of a detecting light is usually met by increasing the power of the emitting light source, which results in a too large power of the emitting light source and a high requirement for heat dissipation of the entire device. In the case that the power is constant, and the light intensity is increased by decreasing an emitting angle of the light to meet the requirement of accurate detection, the detection scope may be sacrificed.

Embodiment 1

Figure 2:
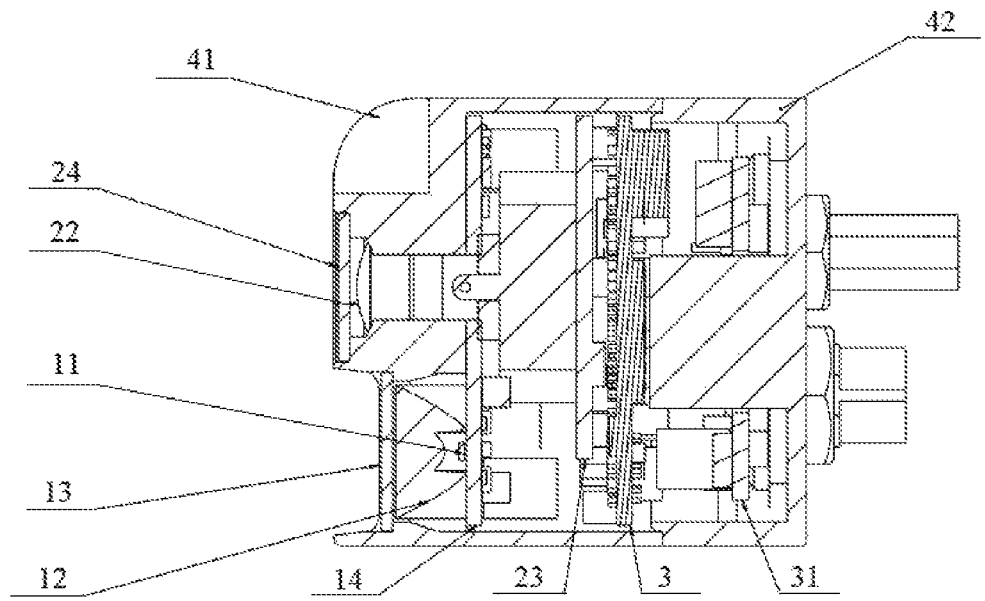
FIG. 2 is a sectional view showing the infrared range-measurement device according to the first embodiment of the present application.
Figure 3:
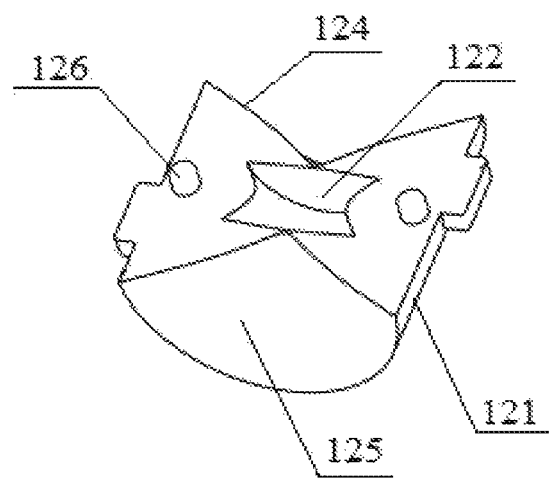
FIG. 3 is a perspective view showing a TIR lens body according to a second embodiment of the present application.
Figure 4:
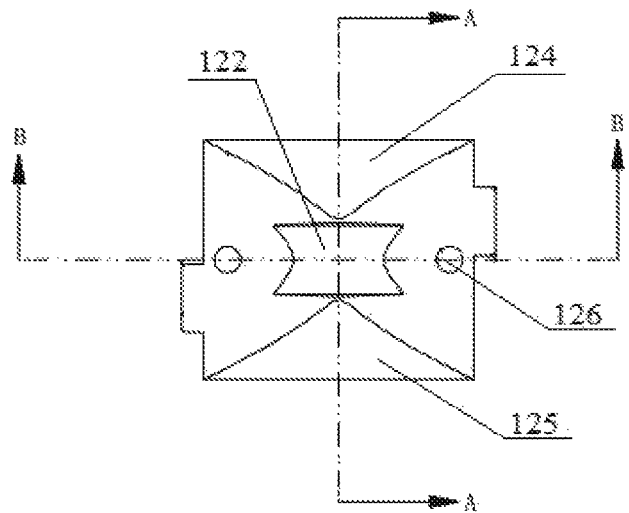
FIG. 4 is a front view showing a TIR lens body according to the second embodiment of the present application.
Figure 5:
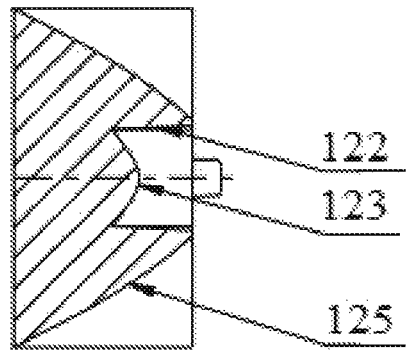
FIG. 5 is a sectional view of FIG. 4 taken along line A-A.
Figure 6:
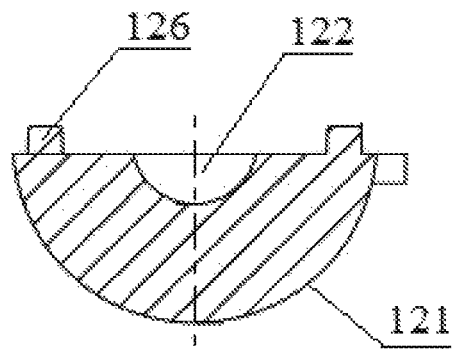
FIG. 6 is a sectional view of FIG. 4 taken along line B-B.

An infrared range-measurement device is provided according to an embodiment of the present application, as shown in FIG. 1 to FIG. 2, including: an emitting module, a receiving module and a calculating module. The emitting module includes an emitting light source and a driving circuit, and the receiving module includes a planar array photosensitive chip. The emitting light source, under the drive of the driving circuit, emits a test light beam, the test light beam is reflected by an object in a test range and then is incident on the planar array photosensitive chip, and the calculating module calculates and outputs a test light intensity or a test distance according to a signal obtained by the planar array photosensitive chip. An emitting lens that shapes the test light beam and then emits it is provided in an emitting light path of the emitting module. The number of the emitting light source is at least one. In a specific application, the planar array photosensitive chip normally is M rows multiplied by N columns, wherein the M rows multiplied by N columns may be 8 multiplied by 8, may also be 64 multiplied by 64, and may further be 320 multiplied by 240.

The emitting lens shapes the test light beam to control its divergence angle and light beam shape to make the test light beam match with the test area of the planar array photosensitive chip, which increases the overall utilization ratio of the test light beam, and makes the measurement of the infrared range-measurement device to be more accurate.

In order to obtain an uniform test light beam and sufficient light intensity, there are multiple emitting light sources 11, and the multiple emitting light sources 11 are arranged according to the test area of the planar array photosensitive chip. Preferably, the number of the emitting light sources 11 is four, and the four emitting light sources 11 are arranged in a straight line. The emitting lens 12 is arranged at a front side of the emitting light sources 11, and is configured to collimate and shape the test light beam emitted by the emitting light sources 11. The arrangement shape of the multiple emitting light sources 11 includes but is not limited to the straight line shape.

The emitting lens 12 is a total internal reflection lens (TIR), as shown in FIG. 3 to FIG. 6. The TIR lens includes a TIR lens body, the TIR lens includes an emitting slot 122 for accommodating the emitting light source 11 and an emitting surface 121 for emitting an incident light. The emitting surface 121 of the TIR lens body encircles an emitting direction of the emitting light source 11 in an arc shape. Two lateral sides of the emitting surface 121 are respectively fitted on the emitting circuit board 14, and the test light beam collimated by the TIR lens body is emitted uniformly after being shaped by the arc-shaped emitting surface 121.

The TIR lens body further includes an abutting surface extending along the emitting circuit board 14 with the emitting slot 122 as the center, and the abutting surface performed with roughening treatment abuts against the emitting circuit board 14. The abutting surface performed with roughening treatment weakens and absorbs the light emitted by the emitting light sources, to prevent the light from entering the emitting light path by reflection of the abutted emitting circuit board 14 and becoming a stray light, thus reducing the accuracy of the scanning range-measurement result. In other embodiments, the TIR lens body includes an abutting surface, and the abutting surface is located on the TIR lens body close to a mounting surface of a specific application device to which the TIR lens is mounted, and the abutting surface extends along the mounting surface to which the TIR lens is mounted.

Preferably, the emitting surface 121 is a semi-cylinder surface having an uniform curvature, a section of the semi-cylinder surface is the abutting surface, and the abutting surface abuts against the emitting circuit board 14. The semi-cylinder surface structure of the emitting surface 121 enables the test light beam to be shaped as strip-shaped light beam after passing through the semi-cylinder surface and be emitted.

Preferably, according to different measuring emphasis of the test area, the curvatures of different areas of the emitting surface 121 are different. The arrangement of different curvatures makes the measuring light beam emitted from the emitting surface 121 has an intensive light in one or several set portions, which enables the test light with sufficient intensity at the light intensive portion to be emitted to a test object in a major measurement area and be reflected and incident on the receiving chip, so that the measured data in the test scope corresponding to the major measurement area is more accurate.

The TIR lens body further includes an emitting slot 122 for accommodating the emitting light source 11, and the emitting slot 122 has an opening arranged on the abutting surface. A bottom surface of the emitting slot 122 is a collimating lens 123, the collimating lens 123 encircles an emitting direction of the emitting light sources 11 in an arc shape. A section of the collimating lens 123 is a convex lens, the collimating lens 123 arranged in the arc shape makes each light, which is emitted from the emitting light source 11 and can be incident on the collimating lens 123, amount to being converged and collimated by the convex lens directly faced the collimating lens and then being emitted.

In order to perform the set shaping to the test light beam and prevent the test light beam from emitting from an outside of the emitting surface 121, the TIR lens body further includes an upper reflecting surface 124 and a lower reflecting surface 125, and the upper reflecting surface 124 and the lower reflecting surface 125 are both cambered surfaces. The test light beams incident on the TIR lens body from both sides of the collimating lens are reflected by the upper reflecting surface 124 and the lower reflecting surface 125 and then emitted from the emitting surface. The upper reflecting surface 124 and the lower reflecting surface 125 effectively reflect and converge the divergent light beams emitted by the emitting light sources 11 onto the emitting surface 121.

Preferably, a cambered surface of each of the upper reflecting surface 124 and the lower reflecting surface 125 is a semi-conical cambered surface, a lowest point of the semi-conical cambered surface is close to a slot wall of the emitting slot 122. The structure of the semi-conical cambered shape enables the incident light which is not incident on the collimating lens 123 to be reflected totally by the upper reflecting surface 124 and the lower reflecting surface 125 and then to be distributed uniformly on the emitting surface 121.

By arranging the cambered emitting surface, the collimated lens, the upper reflecting surface and the lower reflecting surface, the TIR lens body possesses two functions of collimation and shaping at the same time, which simplifies the product structure, saves space, and reduces the manufacturing costs, and further reduces the energy loss of the test light beam caused by treatments of multiple optical components.

For ensuring the stability of the emitting light sources and the driving circuit, as well as the standard and simplicity of assembly, the driving circuit is integrated on the emitting circuit board 14, the emitting light sources and the emitting lenses 12 are all mounted on the emitting circuit board 14, and the emitting light sources are located between the emitting lenses 12 and the emitting circuit board 14.

For a more accurate positioning of the emitting lenses 12 during mounting, each of the emitting lenses 12 is provided with at least two positioning posts 126, and preferably, the two positioning posts 126 are symmetrically arranged. Positioning holes cooperating with the positioning posts for positioning are arranged in the emitting circuit board 14. The arrangement of the positioning posts and positioning holes improves the positioning accuracy of the emitting lenses and the emitting circuit board during mounting, improves the assembling efficiency and reduces the measuring error caused by assembly error.

The connection manner of the emitting lenses 12 and the emitting circuit board 14 may be bonding, clamping, screw fixing, ultrasonic wave fixing and the like. In order to reduce the difficulty in assembling the emitting lenses 12 and the emitting circuit board 14 and improve the fastness and reliability of the connection between the emitting lenses 12 and the emitting circuit board 14, the emitting lens 12 is further provided with at least two clamping pieces on different sides, the emitting circuit board 14 is provided with a buckle clamped to the clamping piece, and the emitting lens 12 is connected to the emitting circuit board 14 through a cooperating connection of the clamping piece and the buckle.

In order to ensure a constant working temperature of the infrared range-measurement device, and to ensure the stability and accuracy of the measurement, a heat conducting piece is attached to the emitting circuit board 14, the heat conducting piece conducts the heat from a higher temperature area to a lower temperature area of the emitting circuit board 14, and then the heat is transferred to an outside space through the housing.

The heat conducting piece is preferably a graphite flake 141, and an inner side and an outer side of the graphite flake 141 are provided with an insulating layer and a heat conducting glue layer respectively. As one of the preferred embodiments, the heat conducting glue layer is attached onto the emitting circuit board 14, and the insulating layer is attached onto a mounting table of the housing. Heat conduction among areas with different temperatures on the emitting circuit board 14 is realized through the graphite flake 141 first, then the heat is transferred to the housing by the graphite flake 141 to dissipate heat, which takes full advantage of the excellent heat conductivity of the graphite flake 141, and allows rapid and uniform heat conduction and dissipation of the whole emitting circuit board 14.

In a specific embodiment, the housing includes a front housing 41 and a rear housing 42 connected to the front housing 41, the front housing 41 abutting against the emitting circuit board 14 receives more conducted heat than the rear housing 42, and an exterior of the front housing 41 is provided with multiple heat-dissipating fins 411. The heat-dissipating fin 411 has a horizontal rib-like structure, which increases a heat dissipation area of the front housing 41 and improves the heat dissipation efficiency.

In order to achieve a better sealing effect, the front housing 41 and the rear housing 42 are seal-connected by a rubber sealing ring or a heat-conducting silicone sealing ring. Preferably, due to the limitation of the cooperation between the structure of the front housing 41 and a robot installed with the infrared range-measurement device, an independent heat-dissipating device cannot be installed inside the infrared range-measurement device, and the gathered heat of the front housing 41 is more than that of the rear housing 42, the front housing 41 and the rear housing 42 are seal-connected through the heat-conducting silicone sealing ring, so that the heat that is not dissipated by the front housing 41 in time can be transmitted to the rear housing 42 through the heat-conducting silicone sealing ring to achieve uniform heat dissipation of the whole product. Further, an independent heat dissipation device is connected to a lower part of the housing, which solves the problem that the heat of the housing cannot be quickly discharged.

In order to achieve a better heat dissipation effect, the housing is made of aluminum, the heat inside the housing is quickly dissipated through the heat-conducting function of the graphite flake 141 and the heat-dissipating function of the aluminum housing, thus preventing a measurement accuracy drop of the infrared scanning range-measurement device caused by a too high working temperature inside the housing.

The housing includes a front housing 41 and a rear housing 42 connected to the front housing 41. A mounting table is provided inside the front housing 41, and a lens channel for accommodating the receiving lens 22 is arranged in the mounting table. The design of the mounting table and the lens channel increases a contacting area between the emitting circuit board 14 and the housing, and meanwhile changes the heat transmission mode from heat radiation dominant mode to heat conduction dominant mode, thus improves the heat dissipation efficiency and ensures the accuracy rate of the long-term test.

In order to prevent the emitting light sources and the receiving lens 22 from forming a crosstalk inside the housing and to improve the accuracy of the infrared range-measurement device, a rubber sleeve 222 is further sleeved on an exterior of the receiving lens 22 arranged in the lens channel, one end of the rubber sleeve 222 abuts against the emitting circuit board 14 on which the emitting light sources are mounted and the other end abuts against a lens mount 221 of the receiving lens 22.

For displaying the working state of the infrared range-measurement device, the front housing 41 is further provided with a light guide post 412, and a bottom end of the light guide post 412 is further provided with a warming light connected to the core board 3 for displaying the working state. The number of the warming light may be one, and when the light is on, it indicates that the device is in operation, and when the light is off, it indicates that the device stops working or fails. The number of the warming lights may also be two, a red light indicates that the device stops working or fails, and a green light indicates normal operation. Of course, the warning light may also has other working modes, which will not be described.

A receiving panel 24 is arranged in the lens channel, and the receiving panel 24 is located at a front side in an emitting path direction of the receiving lens 22. The front housing 41 is further provided with a second through hole for mounting an emitting panel 13. The emitting light source 11 is an LED lamp, light emitted from the LED lamp is modulated infrared light having a dominant wavelength of 850 nm. The receiving panel 24 and the emitting panel 13 are both band pass filters. The band pass filters allow only light having a dominant wavelength within 850±30 nm to pass through. The arrangement of the emitting panel 13 and the receiving panel 24 filters out the interference of the outside natural lights and visible lights of different wave bands, thus reduces the testing noise and improves the testing accuracy.

In order to ensure the working stability of the planar array photosensitive chip to form a modular structure beneficial for assembly, the planar array photosensitive chip is arranged on the receiving circuit board 23, and a receiving lens 22 is arranged, corresponding to the planar array photosensitive chip, on the receiving circuit board 23. The emitting circuit board 14 is further provided with a first through hole 142, and the receiving lens 22 passes through the first through hole 142 and is fixed to the lens channel of the housing. The calculating module is integrated on the core board 3, and the receiving circuit board 23 is connected to the emitting circuit board 14 and the core board 3 by communication interfaces respectively. The sleeve structure of the receiving circuit board 23 and the emitting circuit board 14 makes the product assembly more convenient and the positioning more accurate, and makes the occupation space reduced.

The emitting module, the core board 3 and the receiving module are electrically connected to an aerial socket board 32. The aerial socket board 32 is in communication with the core board 3, the core board 3 is in communication with the emitting module and the receiving module, the aerial socket board 32 is connected to an external power supply and a robot through a female aerial socket 32, and the aerial socket board 32 is connected to a detection upper computer through a male aerial socket 33. The structure of the aerial socket board 32, the female aerial socket 32 and the male aerial socket 33 makes the electric power connection and the communication connection of the infrared scanning testing device more reliable, and the sealing security of the connection positions are ensured at the same time.

Preferably, a heat-dissipating block 34 is further connected to an inner side of the rear housing, and the heat-dissipating block 34 passes through a third through hole and abuts against the core board 3. The arrangement of the heat-dissipating block 34 makes the heat of the core board 3 to be quickly conducted to the rear housing 42 by the heat-dissipating block 34, and the heat is radiated or conducted to the outside by the rear housing 42. The structure of the heat-dissipating block 34 and the aerial socket board 31 may be that the aerial socket board 31 makes room at one side, and may also be that a hole is dug in the center of the aerial socket board 31. Preferably, a third through hole is arranged in the center of the aerial socket board 31, and the heat-dissipating block 34 passes through the third through hole and abuts against the center of the core board 3. The arrangement of the heat-dissipating block abutting against the center of the core board 3 improves the uniformity of the heat conduction of the core board 3, thus improving the heat dissipation efficiency.

In a specific implementation process, due to the requirements of the test area or the limitations of the robot structure and operation environment, not all areas of the planar array photosensitive chip are applicable. Part areas of the planar array photosensitive chip are adjusted into working state, and a divergence angle and a pitch angle of the test light beam and the shape of a light spot formed in the test area are required to match with the set working areas of the planar array photosensitive chip. Further, the working area of the planar array photosensitive chip is adjustable, the shaping range of the emitting lens is adjustable, and the testing scope corresponding to the divergence angle and shape of the test light beam shaped by the emitting lens matches with the set working areas of the planar array photosensitive chip. Wherein, the working area of the planar array photosensitive chip is adjustable, which means that a photosensitive unit on the planar array photosensitive chip can control individually and work independently, for example, rows or columns in a center area of the planar array photosensitive chip are chosen to work, while photosensitive units in other areas are not working.

In conclusion, by adjusting the divergence angle and the pitch angle of the test light beam and the shape of the light spot formed in the test area to match with the working area participating in working of the planar array photosensitive chip, the overall utilization ratio of the test light beam is increased, and the measurement accuracy and speed of the planar array photosensitive chip are also improved.

The technical principle of the present application is described hereinbefore in conjunction with specific embodiments. The discriptions are only intended to explain the principle of the present application, and cannot be explained as limiting the protection scope of the present application in any way. Based on the explanation, other embodiments of the present application may be learned by those skilled in the art without creative efforts, which will all fall into the protection scope of the present application

What is claimed is:

1. An infrared range-measurement device, comprising: an emitting module, a receiving module and a calculating module, wherein the emitting module comprises an emitting light source and a driving circuit, and the receiving module comprises a planar array photosensitive chip;

the emitting light source, under the drive of the driving circuit, emits a test light beam, the test light beam is reflected by an object in a test range and then is incident on the planar array photosensitive chip, and the calculating module outputs a test light intensity or a test distance; and an emitting lens that shapes the test light beam and then emits the test light beam is provided in an emitting light path of the emitting module;

wherein the emitting lens comprises a TIR lens body, the TIR lens body comprises an emitting slot for accommodating the emitting light source and an emitting surface for emitting an incident light, and the emitting surface of the TIR lens body is of an arc shape which encircles around an emitting direction of the emitting light source.

2. The infrared range-measurement device according to claim 1, wherein the TIR lens body further comprises an abutting surface extending along an emitting circuit board with the emitting slot as the center, and the abutting surface performed with roughening treatment is fitted onto the emitting circuit board.

3. The infrared range-measurement device according to claim 1, wherein a bottom surface of the emitting slot is a collimating lens, the collimating lens is of an arc shape which encircles around an emitting direction of the emitting light sources, light incident from the collimating lens is collimated by the collimating lens and then is emitted along the emitting surface.

4. The infrared range-measurement device according to claim 3, wherein the TIR lens body further comprises an upper reflecting surface and a lower reflecting surface, the upper reflecting surface and the lower reflecting surface are both cambered surfaces, light incident into the TIR lens body from both sides of the collimating lens are reflected by the upper reflecting surface and the lower reflecting surface and then emitted from the emitting surface.

5. The infrared range-measurement device according to claim 4, wherein the cambered surface of each of the upper reflecting surface and the lower reflecting surface is a semi-conical cambered surface.

6. The infrared range-measurement device according to claim 3, wherein the emitting surface is a semi-cylinder surface having an uniform curvature; or different areas of the emitting surface have different curvatures.

7. The infrared range-measurement device according to claim 1, wherein the driving circuit is integrated on the emitting circuit board, the emitting light sources and the emitting lens are both mounted on the emitting circuit board, and the emitting light source is located between the emitting lens and the emitting circuit board.

8. The infrared range-measurement device according to claim 7, wherein the emitting lens is provided with at least two positioning posts, and the emitting circuit board is provided with positioning holes matching with the positioning posts.

9. The infrared range-measurement device according to claim 7, wherein a heat conducting piece is attached to the emitting circuit board, and the heat conducting piece conducts the heat from a higher temperature area to a lower temperature area of the emitting circuit board.

10. The infrared range-measurement device according to claim 7, wherein the planar array photosensitive chip is arranged on a receiving circuit board, the receiving circuit board is provided with a receiving lens corresponding to the planar array photosensitive chip, and the emitting circuit board is provided with a first through hole, the receiving lens passes through the first through hole and abuts against a housing.

11. The infrared range-measurement device according to claim 1, wherein a working area of the planar array photosensitive chip is adjustable, a shaping range of the emitting lens is adjustable, and a testing scope corresponding to a divergence angle and a shape of the test light beam shaped by the emitting lens matches with the set working area of the planar array photosensitive chip.

12. The infrared range-measurement device according to claim 1, further comprising a housing, wherein the housing comprises a front housing and a rear housing connected to the front housing, a mounting table is arranged inside the front housing, a lens channel is arranged in the mounting table, a receiving panel is arranged on the lens channel, and a second through hole for mounting an emitting panel is also arranged inside the front housing.

13. The infrared range-measurement device according to claim 12, wherein a rubber sleeve is further sleeved on an exterior of the receiving lens arranged in the lens channel, and the rubber sleeve has one end abutting against an emitting circuit board on which the emitting light source is mounted and another end abutting against a lens mount of the receiving lens.

14. The infrared range-measurement device according to claim 12, wherein at least one of the receiving panel and the emitting panel is a band pass filter.

15. The infrared range-measurement device according to claim 12, wherein an exterior of the front housing is provided with a plurality of heat-dissipating fins, wherein a heat-dissipating block is further connected to an inner side of the rear housing, and the heat-dissipating block abuts against the core board on which the calculating module is integrated.

16. The infrared range-measurement device according to claim 1, wherein the number of the emitting light sources is four, and the four emitting light sources are arranged in a straight line.

17. A TIR lens, comprising a TIR lens body, wherein the TIR lens body comprises an emitting slot for accommodating the emitting light source and an emitting surface for emitting an incident light, and the emitting surface of the TIR lens body is of an arc shape which encircles around an emitting direction of the emitting light source.

18. The TIR lens according to claim 17, wherein the TIR lens body further comprises an abutting surface performed with hazing treatment.

19. The TIR lens according to claim 17, wherein a bottom surface of the emitting slot is a collimating lens, the collimating lens is of an arc shape which encircles around an emitting direction of the emitting light source, a light that enters from the collimating lens is collimated by the collimating lens and then emitted along the emitting surface.

20. The TIR lens according to claim 19, wherein the TIR lens body further comprises an upper reflecting surface and a lower reflecting surface, the upper reflecting surface and the lower reflecting surface are both cambered surfaces, light incident on the TIR lens body from both sides of the collimating lens is reflected by the upper reflecting surface and the lower reflecting surface and then emitted from the emitting surface.

21. The TIR lens according to claim 20, wherein the cambered surface of each of the upper reflecting surface and the lower reflecting surface is a semi-conical cambered surface.

22. The TIR lens according to claim 20, wherein the emitting surface is a semi-cylinder surface having a uniform curvature.

23. The TIR lens according to claim 20, wherein different areas of the emitting surface have different curvatures, and lights emitting from the emitting surface concentrate on one or a plurality of set areas.

24. An infrared range-measurement device, comprising the TIR lens according to claim 17.

* * * * *